United States Patent
Voss

(10) Patent No.: US 10,852,918 B1
(45) Date of Patent: Dec. 1, 2020

(54) CONTEXTUAL INFORMATION IN CHAT

(71) Applicant: Snap Inc., Santa Monica, CA (US)

(72) Inventor: Jeremy Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/297,152

(22) Filed: Mar. 8, 2019

(51) Int. Cl.
*G06F 3/0484* (2013.01)

(52) U.S. Cl.
CPC .................. *G06F 3/0484* (2013.01)

(58) Field of Classification Search
CPC .................................................. G06F 3/0484
See application file for complete search history.

(56) References Cited

U.S. PATENT DOCUMENTS

| | | |
|---|---|---|
| 5,880,731 A | 3/1999 | Liles et al. |
| 6,023,270 A | 2/2000 | Brush, II et al. |
| 6,223,165 B1 | 4/2001 | Lauffer |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |

(Continued)

FOREIGN PATENT DOCUMENTS

| | | |
|---|---|---|
| CN | 109863532 A | 6/2019 |
| CN | 110168478 A | 8/2019 |

(Continued)

*Primary Examiner* — Anil K Bhargava
(74) *Attorney, Agent, or Firm* — Schwegman Lundberg & Woessner, P.A.

(57) ABSTRACT

Aspects of the present disclosure involve a system comprising a computer-readable storage medium storing a program and a method for providing contextual activity information. The program and method include receiving a request from a first user device to communicate with a second user device; determining whether location information of the second user device is available to the first user device; in response to determining that the location information of the second user device is available to the first user device, determining contextual activity information for the second user based on a current location of the second user device; and generating, for display on the first user device, a visual representation of the second user and the contextual activity information in a graphical user interface that enables the first user device to communicate with the second user device.

20 Claims, 10 Drawing Sheets

(56) References Cited

U.S. PATENT DOCUMENTS

| | | |
|---|---|---|
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0265823 A1* | 10/2012 | Parmar ............... H04W 4/21 709/206 |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0365944 A1* | 12/2014 | Moore ................ G01C 21/00 715/772 |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2016/0378427 A1* | 12/2016 | Sharma ............... G10L 19/018 700/94 |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0310934 A1 | 10/2017 | Du et al. |
| 2017/0312634 A1 | 11/2017 | Ledoux et al. |
| 2017/0339237 A1* | 11/2017 | Memon ............... H04L 67/18 |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0227875 A1* | 8/2018 | Khan ................. H04W 64/00 |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0321826 A1* | 11/2018 | Bereza ............... G06F 3/04883 |
| 2019/0001223 A1 | 1/2019 | Blackstock et al. |
| 2019/0057616 A1 | 2/2019 | Cohen et al. |
| 2019/0149863 A1* | 5/2019 | Lewis ................ G06N 20/00 |
| 2019/0188920 A1 | 6/2019 | Mcphee et al. |
| 2019/0250798 A1* | 8/2019 | Rathod ............... G06F 3/005 |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |

(56) References Cited

FOREIGN PATENT DOCUMENTS

| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

\* cited by examiner

CONTEXTUAL INFORMATION IN CHAT

TECHNICAL FIELD

The present disclosure relates generally to providing contextual information during a conversation.

BACKGROUND

Users are always seeking new ways to connect with their friends on social media platforms. One way users try to connect with their friends is by discussing what activities they are currently involved in. Figuring out what a given user's friends are currently doing, to engage in such a discussion, involves looking through recent posts on the social media platform and recently uploaded pictures or searching through recently provided updates. Because this can take a great deal of time and effort, users end up missing out on precious opportunities to connect with their friends.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
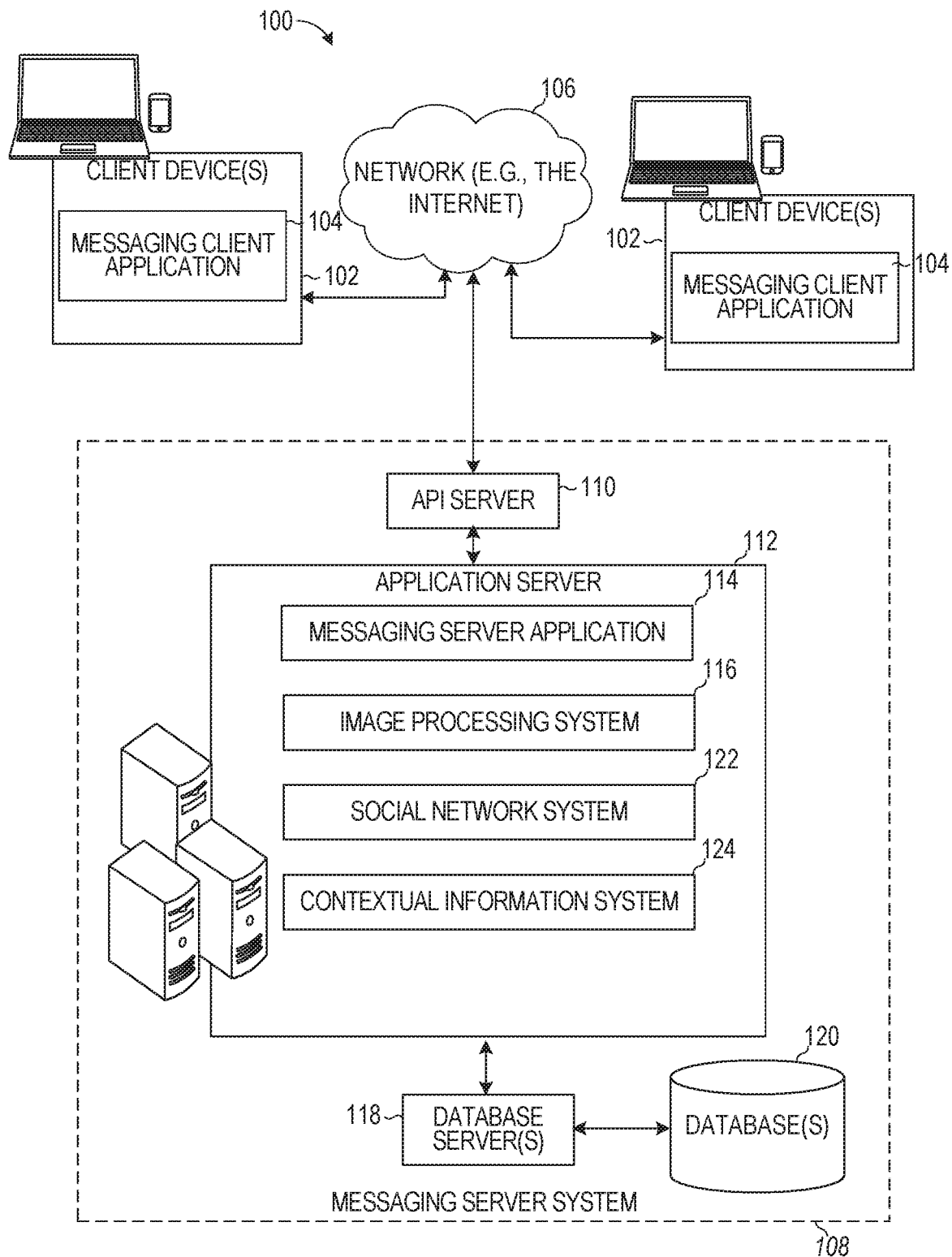
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typical social media network platforms allow users to connect with one another through a chat screen. A given user is presented with a list of their friends and the user can pick and choose which of the friends the given user wants to communicate with. In certain cases, users are given the option to manually input and change their current status. For example, a given user can manually indicate what they are doing to update their status and this status is then shared with all of their friends. While such systems work well to generally inform others about activities a given user is performing, manually updating this status information is daunting.

The design of these typical social networking systems requires the user to constantly remember to update their status as they transition from one activity to another. Because users typically forget to update their status, such status information becomes stale and meaningless, which is why most users decide not to update their status information in the first place. In addition, as the status information is generally made available to all of the user's friends, users are sometimes unmotivated to update the status information if they want only some of their friends to know what they are currently doing.

The disclosed embodiments improve the efficiency of using the electronic device by automatically providing contextual activity information in a graphical user interface of a messaging application. Specifically, the disclosed embodiments allow a first user to decide whether or not to share a location with one or more of the user's friends (e.g., a second user). In some implementations, if the first user is sharing their location with the second user, the first user's current contextual activity information is determined and provided to the second user automatically. This contextual activity information of the first user that is provided to the second user is automatically generated and determined based on one or more factors associated with the current location of a device of the first user. In some embodiments, the contextual activity information is presented in a chat window of the messaging application together with information identifying the first user, such as an avatar of the first user, in response to a request received from a device of the second user to communicate with the device of the first user. In some embodiments, if the first user is not sharing their location with the second user, the current contextual activity information is not provided to the second user by not being presented in the chat window of the messaging application.

In some implementations, if the first user is within a threshold distance of an airport, the contextual activity information is automatically generated to indicate the first user is at an airport or is travelling. In some implementations, if the device of the first user is determined to be in motion, the contextual activity information is automatically generated to indicate the first user is driving or flying. In some implementations, if the device of the first user is within a threshold distance of a golf course, the contextual activity information is automatically generated to indicate the first user is playing a sport. In some implementations, if a battery charging status of the device of the first user is determined to be in a charging state, the contextual activity information is automatically generated to indicate the first user is stationary, at work, or at home. In some implementations, if a last time since the device of the first user has accessed the messaging application or last seen on a social network map is more than a threshold amount, the contextual activity information is automatically generated to indicate the first user is inactive or sleeping.

In some embodiments, additional location information about the first user is provided to the second user based on whether the first and second users are in the same state or country. In particular, if the first and second users are determined to be in the same geographical region (e.g., state), then the graphical user interface used to exchange messages does not include an identifier of the state. If the first and second users are determined to be in different states, then the graphical user interface that is presented to the second user to exchange messages with the first user includes an identifier of the state of the first user. Similarly, if the first and second users are determined to be in different countries, then the graphical user interface that is presented to the second user to exchange messages with the first user includes an identifier of the country of the first user.

In some embodiments, if the first user is not actively engaged in an activity, then the contextual activity information presented in the graphical user interface to the second user identifies the specific location of the first user. If the first user is actively engaged in an activity, then the contextual activity information presented in the graphical user interface to the second user identifies the activity in which the first user is engaged and does not identify the specific location of the first user.

By presenting to a user the contextual activity information of the user's friends automatically, the user is provided with enriched information the user can use to engage in a communication with their friends. Also, by automatically determining the contextual activity information of a given user, the user can share their current activity information with selected friends without having to manually update this information each time the activity changes. Namely, with minimal user input, a user can share their current activities with their friends automatically and the user's friends can automatically see the activities their friends are engaged in. In this way, rather than paging through multiple screens of information to obtain or provide activity information, users are presented with meaningful contextual activity information quickly and simply by sharing the user's location and/or selecting a given user with whom to communicate.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

In some implementations, the messaging client application 104 allows a first user share the location of the client device 102 of the first user with the client device 102 of a second user and/or multiple client device of multiple other users. The messaging client application 104 presents a graphical user interface to the first user which lists several options. The first user can select a first option to share the first user's current location with all of the first user's friends on the social network system. The first user can select a second option to view a list of the first user's friends to choose which friends or groups of friends with whom the first user would like to share the first user's location. The messaging client application 104 determines the first user's location automatically and automatically determines contextual activity information for the first user. This contextual activity information is made available to those friends with whom the first user selected to share the first user's location. In some implementations, the contextual activity information identifies a particular activity the first user is actively engaged in (e.g., playing baseball, golf, or a sport). In some implementations, if the first user is not actively engaged in an activity, the contextual activity information only specifies the current location (e.g., country, state, or place such as home) of the first user.

The messaging client application 104 of a friend, such as a second user, of the first user presents a graphical user interface to the second user. The graphical user interface allows the second user to select an option (e.g., by tapping on an identifier of the first user) to communicate with the first user. In response to selection of this option, the messaging client application 104 opens a graphical user interface, such as a chat screen, that allows the second user to send one or more messages, images, or videos to the first user. This chat screen selectively provides the contextual activity information of the first user to the second user depending on whether the first user has selected to share the first user's location with the second user. For example, if the first user has selected the option to share the first user's location with the second user, the chat screen provides the contextual activity information determined automatically for the first user to the second user. For example, if the first user has selected the option to prevent sharing the first user's location with the second user, the chat screen excludes or prevents providing the contextual activity information determined automatically for the first user to the second user.

In some implementations, the contextual activity information is presented under or adjacent to a name or identifier of the first user to the second user and/or next to an avatar of the first user. In some implementations, the contextual activity information is automatically determined by the messaging client application 104 using a social network map which displays current locations of users of the social network.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the contextual information system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the contextual information system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The application server 112 is communicatively coupled to a database server 118, which facilitates access to a database 120 in which is stored data associated with messages processed by the messaging server application 114.

Figure 2:
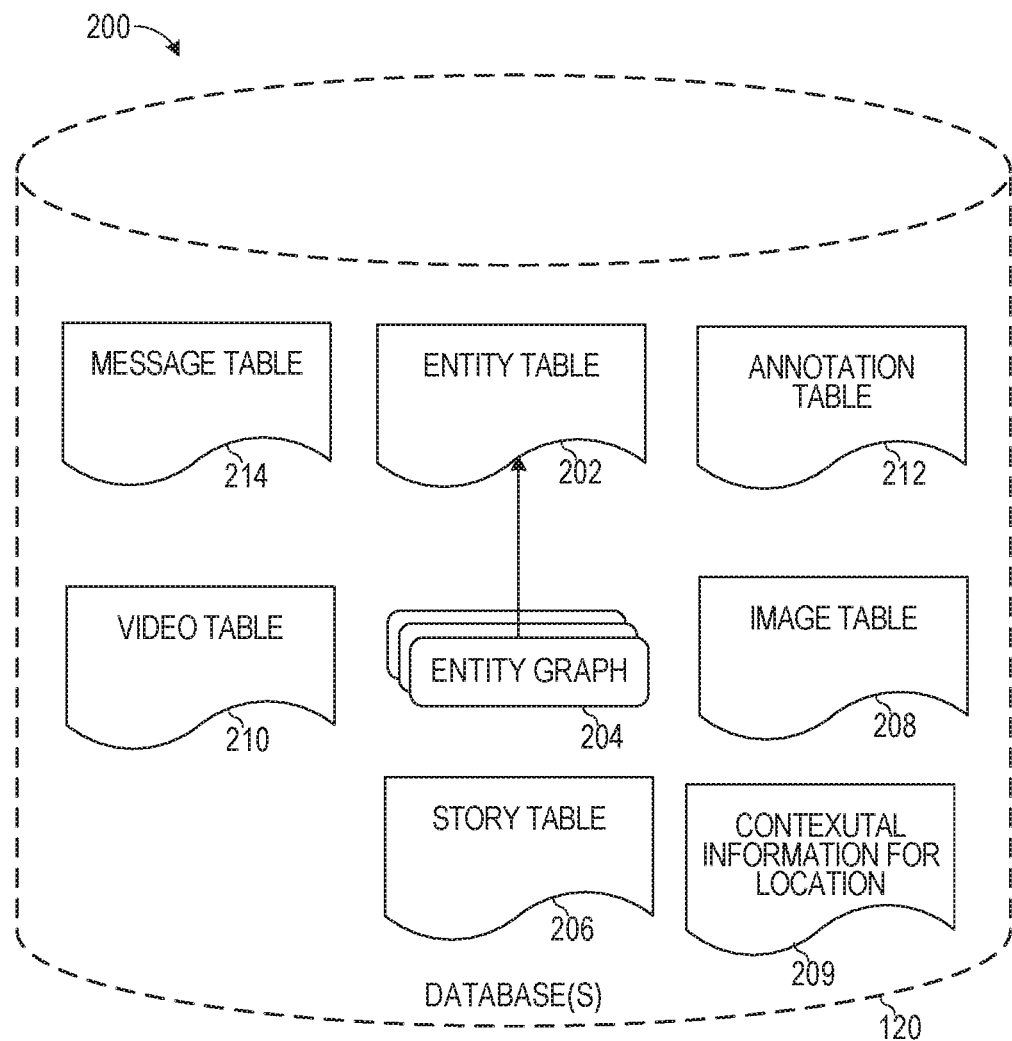
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Contextual information for location 209 stores contextual activity information the contextual information system 124 uses to provide contextual activity information to users in a graphical user interface, such as a chat screen. In some implementations, contextual information for location 209 stores various combinations of factors associated with a location with corresponding activity information. For example, contextual information for location 209 stores a message indicating a given user is at an airport or is travelling in association with a factor that indicates the given user or device of the given user is within a threshold distance of an airport. As another example, contextual information for location 209 stores a message indicating a given user is driving or flying in association with a factor that indicates the device of the given user is in motion.

As another example, contextual information for location 209 stores a message indicating a given user is playing a sport in association with a factor that indicates the device of the given user is within a threshold distance of a golf course. As another example, contextual information for location 209 stores a message indicating a given user is stationary, at work, or at home in association with a factor that indicates a battery charging status of the device of the given user is in a charging state. As another example, contextual information for location 209 stores a message indicating a given user is inactive or sleeping in association with a factor that indicates a last time the device of the first user has accessed the messaging client application 104 or has last been seen or active on a social network map exceeds a threshold amount.

As another example, contextual information for location 209 stores a message indicating a given user is on a boat in association with a combination of factors that indicate the device of the given user is in motion, the location of the device overlaps an area of a map that includes a body of water (e.g., the ocean or a river), and/or the time of day currently is daytime. As another example, contextual information for location 209 stores a message indicating a given user is at work in association with a combination of factors that indicate a battery charging status of the device of the given user is in a charging state, the current location of the user indicated by a GPS device overlaps or is within a threshold distance of a work address of the user, and the current time of day is during working hours (e.g., 9 AM-5 PM).

As another example, contextual information for location 209 stores a message indicating a given user is at home in association with a combination of factors that indicate a battery charging status of the device of the given user is in a charging state, the current location of the user indicated by a GPS device overlaps or is within a threshold distance of a home address of the user, and the current time of day is during dinner, night-time or weekend hours (e.g., 6 PM-6 AM). As another example, contextual information for location 209 stores a message indicating a given user is playing tennis in association with a combination of factors that indicate the device of the given user is within a threshold distance of a tennis court and an avatar of the user has been selected by the given user to include a tennis racket. As another example, contextual information for location 209 stores a message indicating a given user is at an airport or is travelling in association with a combination of factors that indicate the given user or device of the given user is within a threshold distance of an airport, is over 10,000 feet above sea level, and an avatar of the user has been selected by the given user to include luggage. As another example, contextual information for location 209 stores a message indicating a given user is on an airplane in association with a combination of factors that indicate the given user or device of the given user is over 10.000 feet above sea level and the device of the given user is in a charging state and connected to receive power from a USB port.

Contextual information for location 209 may store messages representing the activity information with text including: name of a place or location. "golfing". "swimming," "running," "walking," "playing a sport." "sleeping," "home." "flying," "driving." waiting at a specific airport or airport code (e.g., LGA), "on a boat," and/or "on a train."

Contextual information for location 209 may store indications of which users are sharing locations with which other users. In an implementation, contextual information for location 209 cross-references entity graph 204 and stores indications of which user or set of users a given friend has selected an option to share a location with. When a second user of contextual information system 124 requests to communicate with a first user, the contextual information system 124 searches the contextual information for location 209 to determine whether the first user has authorized to share the first user's location with the second user.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story." which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
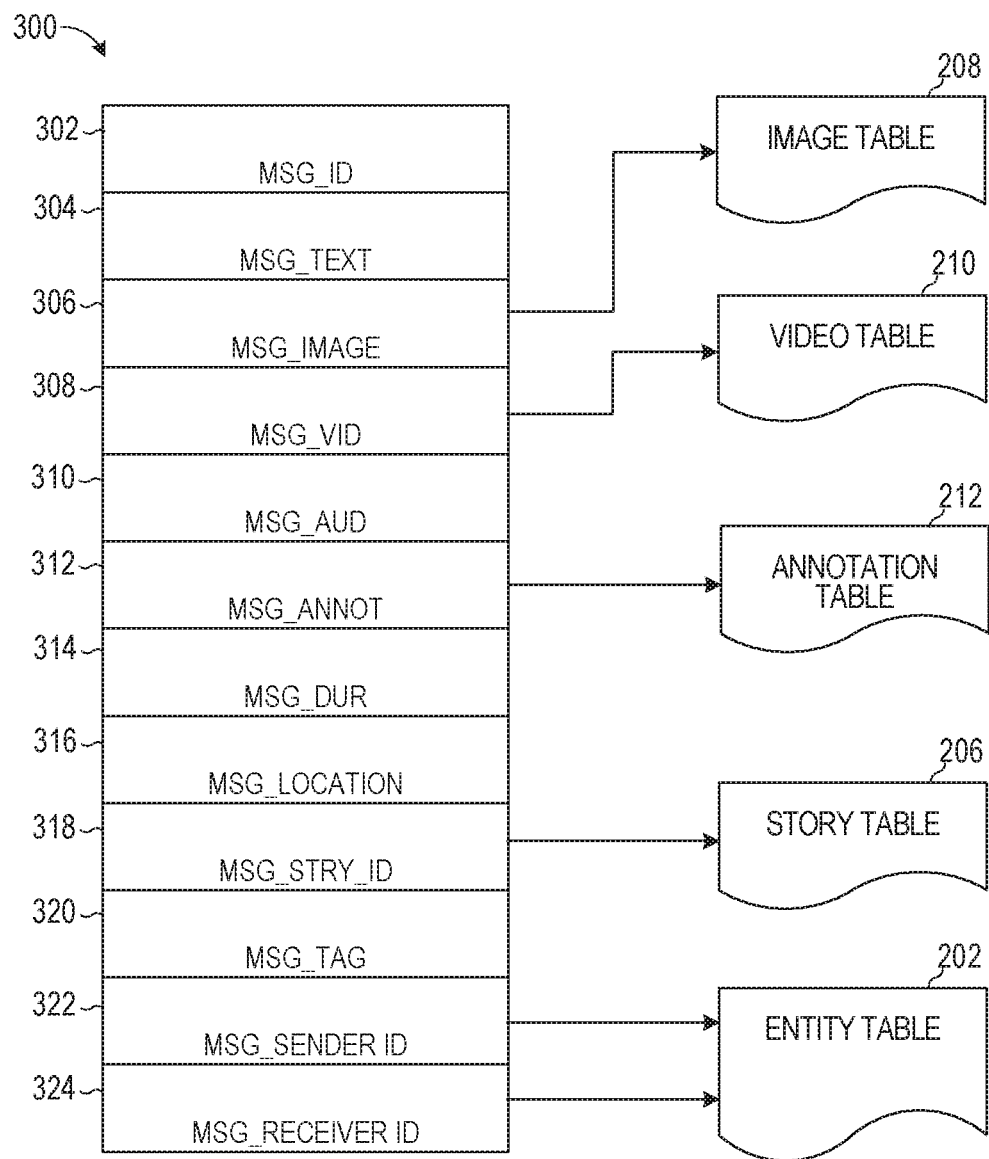
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

- A message identifier 302: a unique identifier that identifies the message 300.
- A message text payload 304: text, to be generated by a user via a UI of the client device 102 and that is included in the message 300.
- A message image payload 306: image data, captured by a camera component of a client device 102 or retrieved from memory of a client device 102, and that is included in the message 300.
- A message video payload 308: video data, captured by a camera component or retrieved from a memory component of the client device 102 and that is included in the message 300.
- A message audio payload 310: audio data, captured by a microphone or retrieved from the memory component of the client device 102, and that is included in the message 300.
- Message annotations 312: annotation data (e.g., filters, stickers, or other enhancements) that represents annotations to be applied to message image payload 306, message video payload 308, or message audio payload 310 of the message 300.
- A message duration parameter 314: parameter value indicating, in seconds, the amount of time for which content of the message (e.g., the message image payload 306, message video payload 308, message audio payload 310) is to be presented or made accessible to a user via the messaging client application 104.
- A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).
- A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.
- A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.
- A message sender identifier 322: an identifier (e.g., a messaging system identifier, email address, or device identifier) indicative of a user of the client device 102 on which the message 300 was generated and from which the message 300 was sent.
- A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
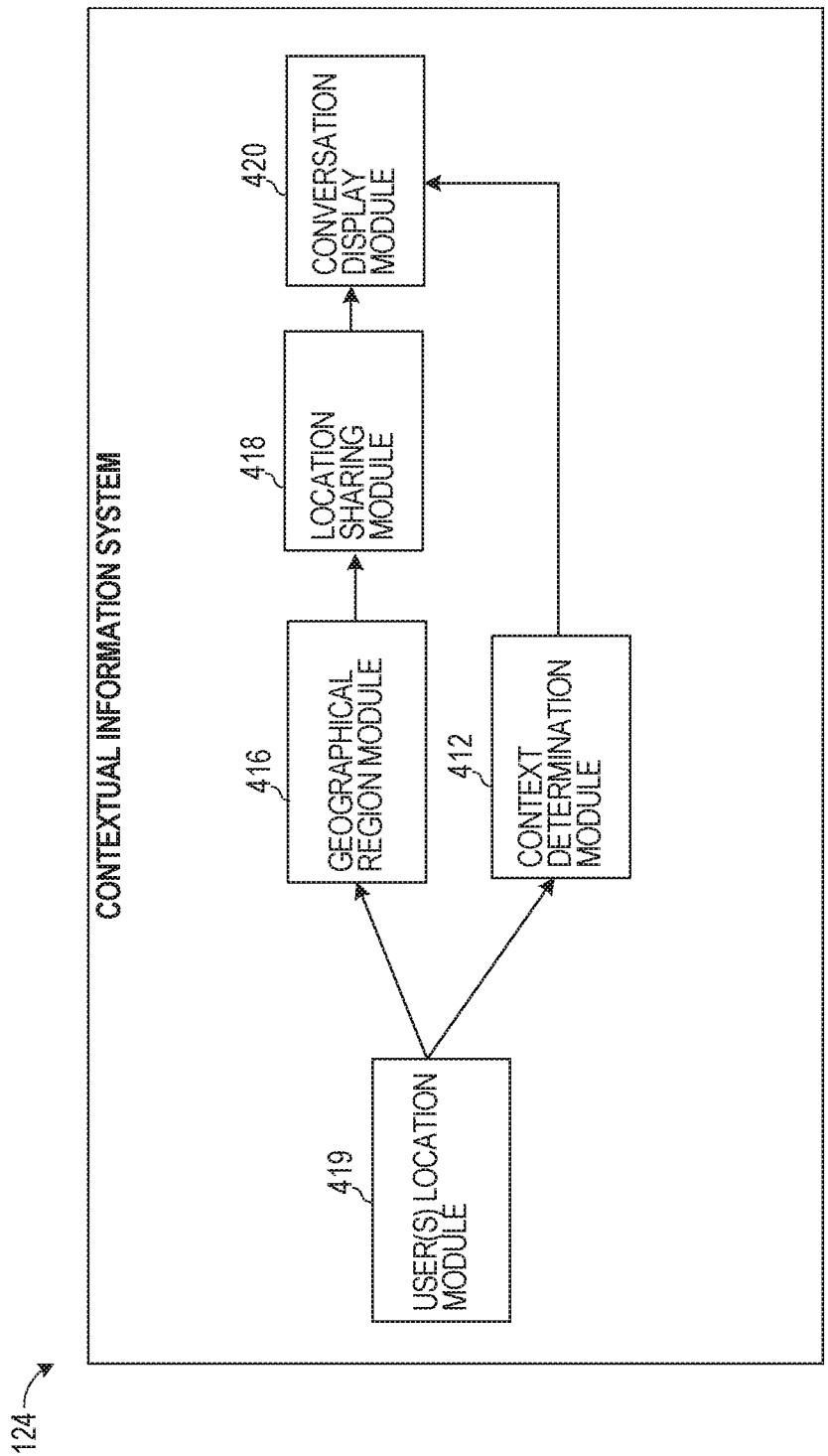
FIG. 4 is a block diagram showing an example contextual information system, according to example embodiments.

FIG. 4 is a block diagram showing an example contextual information system 124, according to example embodiments. Contextual information system 124 includes user(s) location module 419, geographical region module 416, context determination module 412, location sharing module 418, and conversation display module 420.

User(s) location module 419 accesses a list of friends/family members the user specifies for inclusion in the messaging client application 104. User(s) location module 419 accesses the list of friends and communicates with the social network system 122 to determine the geographical location of each selected friend. In some implementations, the geographical location obtained by the user(s) location module 419 represents the live current location of a device associated with each accessed friend and/or a pre-stored or pre-specified location associated with that friend representing where the friend lives or resides.

Context determination module 412 accesses social network system 122 to obtain current context activity information for users in the messaging client application 104. For example, the context determination module 412 may communicate with an accelerometer of a given user device to determine a speed at which the device is moving. If the speed exceeds a first specified amount, the context determination module 412 determines that the device and user are in a car. If the speed exceeds a second specified amount greater than the first amount, the context determination module 412 determines that the device and user are in an airplane. As another example, context determination can be based on location alone or in combination with speed. For example, context determination module 412 may determine the user is located at sea or on a lake. Based on the context activity information obtained by the context determination module 412, the context determination module 412 automatically generates a message or indication for presentation to one or more users in a conversation interface (e.g., a graphical user interface including a chat screen).

In some implementations, the context determination module 412 communicates with the contextual information for location 209 storage to retrieve associated context activity information for one or more combination of factors of a given user device. In some embodiments, in response to determining that a particular combination of factors associated with a given user and/or device matches one of the combination of factors listed in the contextual information for location 209, context determination module 412 determines that the user is actively engaged in an activity that matches the combination of factors. In some embodiments, in response to determining that a particular combination of factors associated with a given user and/or device fails to match any of the combination of factors listed in the contextual information for location 209, context determination module 412 determines that the user is not actively engaged in an activity.

For example, context determination module 412 receives a current location of a given user device. Context determination module 412 communicates with a map-based interface to determine whether the current location is within a threshold distance (e.g., less than 300 feet) of a particular type of place (e.g., a restaurant). Context determination module 412 may also determine that the current location is not changing frequently (e.g., is moving less than 5 feet every minute) meaning the user device is stationary. In such circumstances, the context determination module 412 determines that the activity being performed by the user of the device is associated with the particular type of place (e.g., dining at a restaurant if the type of place is a restaurant or waiting at an airport if the type of place is an airport). In some implementations, the context determination module 412 determines that the activity being performed is associated with the particular type of place by retrieving the activity from the contextual information for location 209 storage that is associated with the combination of factors (e.g., current location is within a threshold distance of a particular type of place and device location is not changing frequently).

Geographical region module 416 receives a current location of a given user or set of users from user(s) location module 419. Geographical region module 416 determines a state and/or country that is within a specified distance or threshold (e.g., within 10 miles) of the location provided by the user(s) location module 419. In this way, geographical region module 416 determines whether first and second users are in the same state or country. The geographical region module 416 provides the determined state or country and an indication of whether or not the first and second users are within the same state or country to conversation display module 420. In an embodiment, when two users are determined to be in the same state, a representation of the state (e.g., a two-letter abbreviation of the state) is excluded from being presented in the graphical user interface the first and second users use to communicate with each other in the messaging client application 104. When two users are determined to be in different states, a representation of the other user's state (e.g., a two-letter abbreviation of the state) is included in the graphical user interface the first and second users use to communicate with each other in the messaging client application 104.

For example, if a first user is in California and the second user is in Florida, the graphical user interface of the messaging client application 104 of the second user displays the two-letter abbreviation for California (CA) adjacent to and simultaneously with the contextual activity information of the first user that is presented. Similarly, when two users are determined to be in different countries, a representation of the country is included in the graphical user interface the first and second users use to communicate with each other in the messaging client application 104. For example, if a first user is in Spain and the second user is in the USA, the graphical user interface of the messaging client application 104 of the second user displays the name of the country, Spain, adjacent to and simultaneously with the contextual activity information of the first user that is presented.

In some embodiments, a given user of the messaging client application 104 accesses the location sharing module 418 to specify a list of one or more users with whom the given user would like to share the location of the given user. For example, a list of users is presented by the location sharing module 418 to the given user. The list of users includes the given user's friends or contacts on the messaging client application 104. Any user that the given user selects from the list of users is identified to the location sharing module 418 as being authorized to share the given user's location. In such cases, a GPS location of a device of the given user can be used to provide the given user's current location or contextual activity information to the users selected from the list.

Location sharing module 418 accesses contextual information for location 209 to determine whether a given user has authorized his location to be shared with other users. For example, when a first user desires to communicate with a second user, the location sharing module 418 determines whether the second user has previously selected an option to share the second user's location with the first user or a group of users that includes the first user. The location sharing module 418 indicates whether or not the second user has selected the option to share the location with the first user to the conversation display module 420. Based on whether or not the second user has selected the option to share the location with the first user, the conversation display module 420 selectively displays information received from the geographical region module 416 and/or the context determination module 412. For example, the context activity information determined for the second user by the context determination module 412 is included in the conversation interface generated for display to the first user if the second user has selected the option to share the location of the second user with the first user. The context activity information determined for the second user by the context determination module 412 is precluded from display in the conversation interface generated for display to the first user if the second user has selected the option not to share the location of the second user with the first user.

Figure 5:
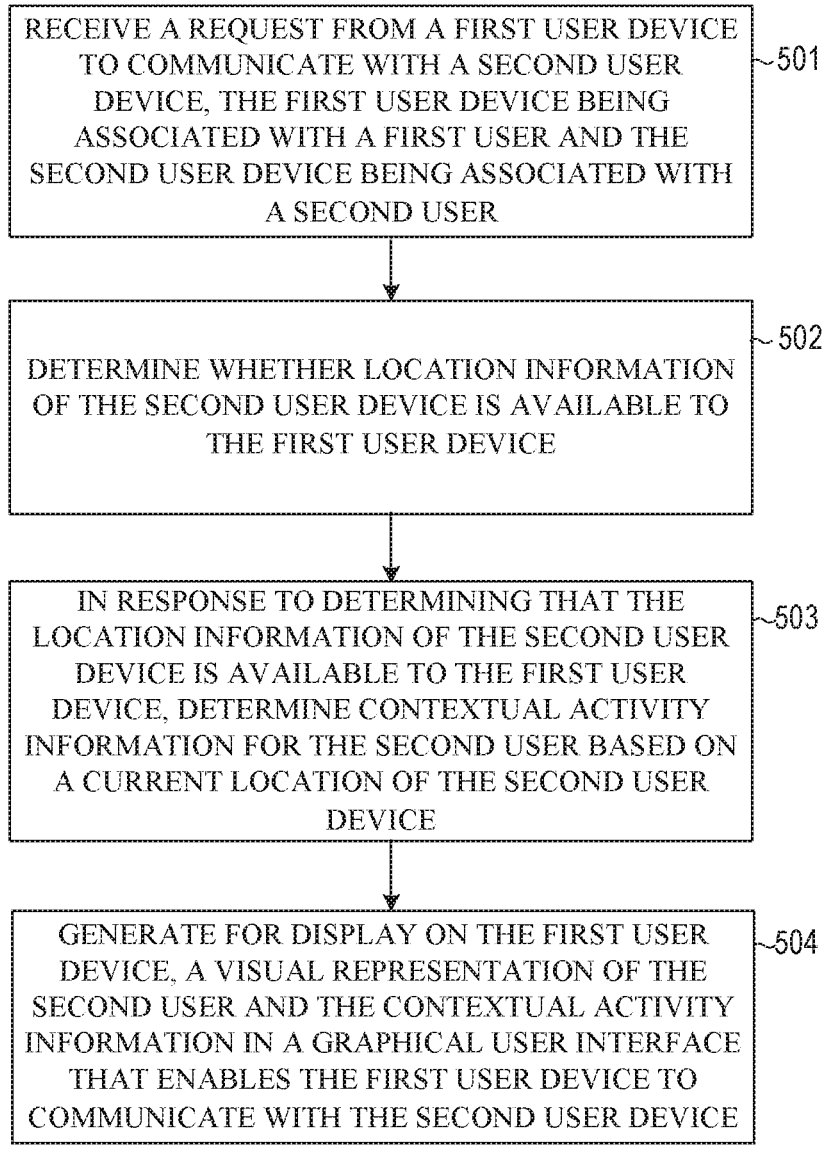
FIG. 5 is a flowchart illustrating example operations of the contextual information system, according to example embodiments.

FIG. 5 is a flowchart illustrating example operations of the contextual information system 124 in performing process 500, according to example embodiments. The process 500 may be embodied in computer-readable instructions for execution by one or more processors such that the operations of the process 500 may be performed in part or in whole by the functional components of the messaging server system 108 and/or messaging client application 104; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the contextual information system 124 receives a request from a first user device to communicate with a second user device, the first user device being associated with a first user and the second user device being associated with a second user. For example, the conversation display module 420 presents a list of users or groups of different users to a first user. The first user selects one or more users in the list to load a chat graphical user interface screen to send one or more messages, videos or images to the selected one or more users.

At operation 502, the contextual information system 124 determines whether location information of the second user device is available to the first user device. For example, context determination module 412 determines whether the second user with whom the first user requests to communicate has previously authorized, using the location sharing module 418, the second user's location to be shared with the first user.

At operation 503, the contextual information system 124, in response to determining that the location information of the second user device is available to the first user device, determines contextual activity information for the second user based on a current location of the second user device. For example, the context determination module 412 determines context activity information for the second user based on the current location of the second user as determined by the user(s) location module 419.

At operation 504, the contextual information system 124 generates, for display on the first user device, a visual representation of the second user and the contextual activity information in a graphical user interface that enables the first user device to communicate with the second user device. For example, the conversation display module 420 generates a chat screen to the first user that identifies the second user (e.g., using an avatar and a name of the second user) and the context activity information determined for the second user.

Figure 6:
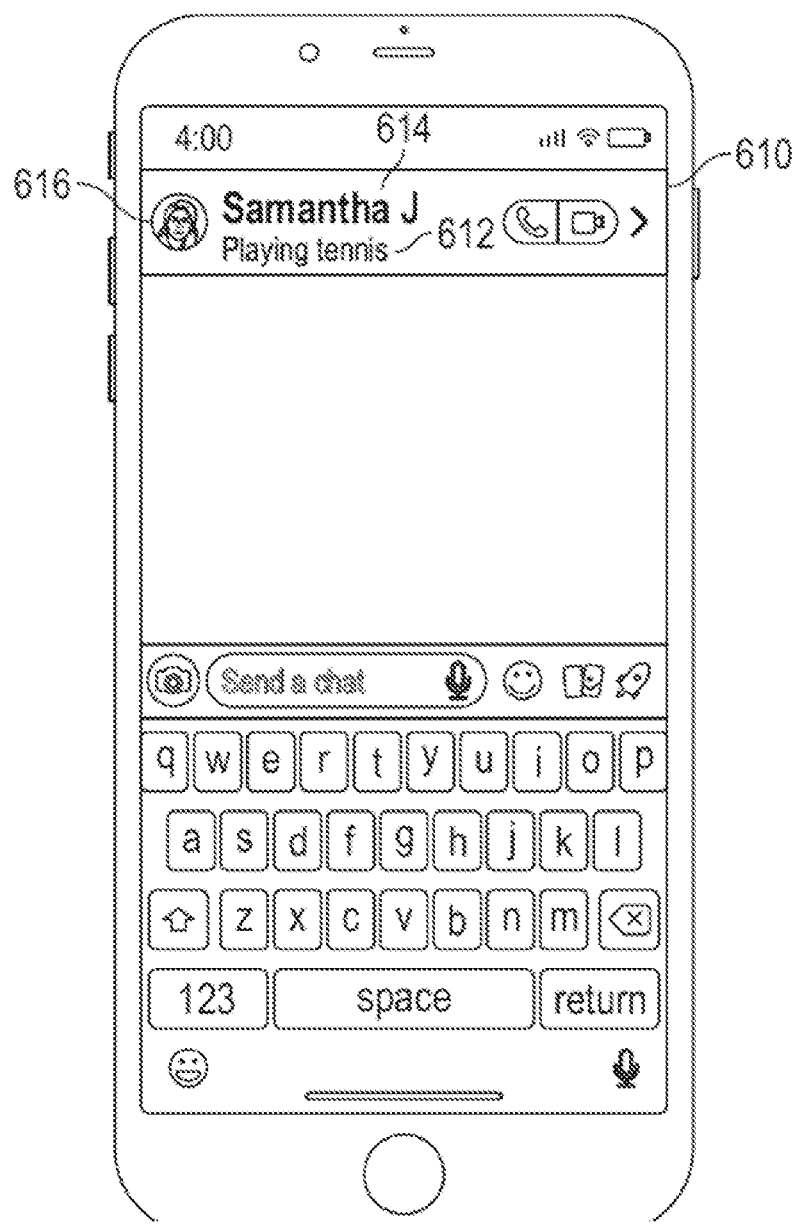
FIGS. 6-8 are illustrative inputs and outputs of the contextual information system, according to example embodiments.
Figure 7:
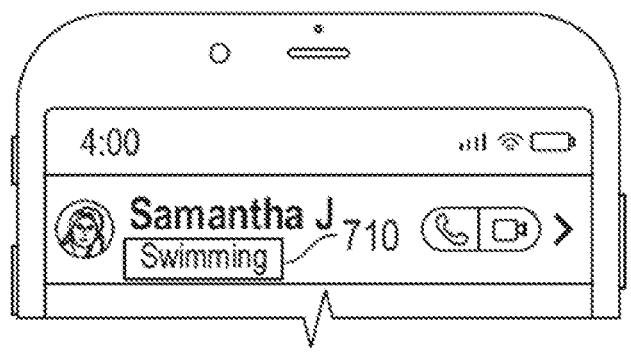
Figure 7:
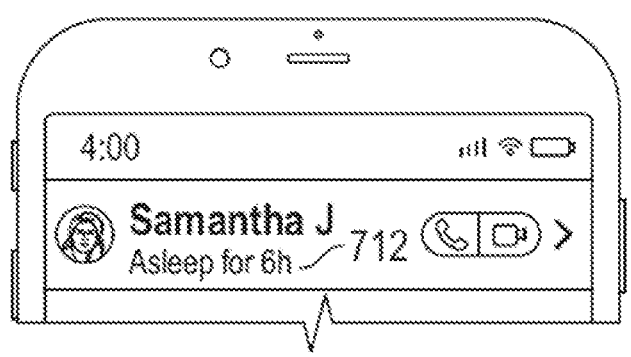
Figure 7:
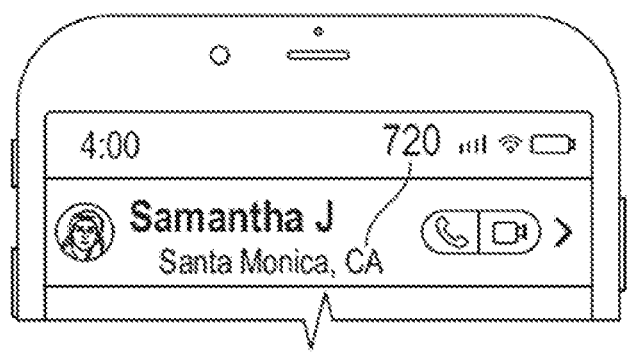
Figure 8:
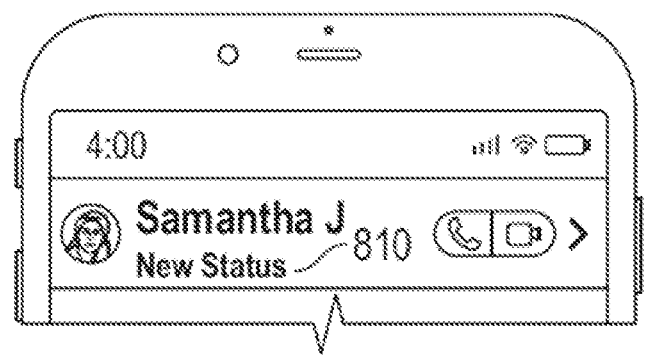
Figure 8:
Figure 8:
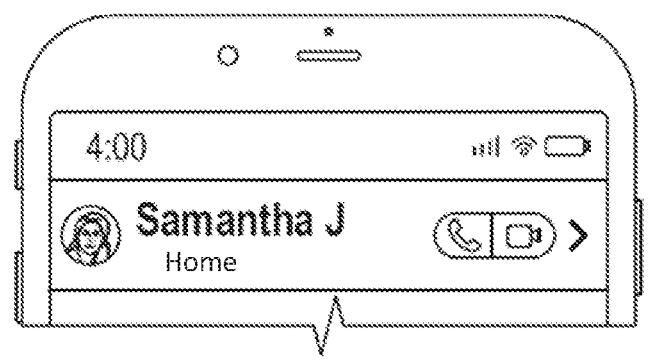

FIGS. 6-8 show illustrative inputs and outputs of the contextual information system 124, according to example embodiments. The inputs and outputs shown in FIGS. 6-8 can be implemented by the messaging client application 104. For example, FIG. 6 shows an illustrative chat screen generated by the conversation display module 420 in response to a user request to communicate with a given user "Samantha J". As shown in FIG. 6, the chat screen includes a graphical user interface region 610 in which the identity of the selected user is displayed, including an avatar 616 of the selected user and the name 614 of the selected user. Also included underneath the name 614 and adjacent to the avatar 616 is the context activity information 612 of the selected user. For example, contextual information system 124 determines that the selected user has authorized their location to be shared with the user who requested to communicate with the selected user and, in response, presents an indication that the selected user is currently "Playing tennis". This is determined based on a current location and/or one or more combination of factors associated with the selected user.

In some embodiments, in response to receiving a user selection (e.g., if the user taps) of the graphical user interface region 610 (or a portion of the graphical user interface region 610, such as the name 614, avatar 616, or context activity information 612), a friendship profile is presented. The friendship profile represents prior interactions the given user and the selected user (Samantha J) have had in the past. For example, the friendship profile includes a list of videos or images shared by the two users, previously exchanged messages that one or both of the users have saved, and/or a list of friends the two users have in common. Further details of a friendship profile are provided in commonly-assigned Matthey Colin Grantham et al., U.S. patent application Ser. No. 16/141,612, filed Sep. 25, 2018, entitled "INTERFACE TO DISPLAY SHARED USER GROUPS", which is hereby incorporated by reference.

FIG. 7 shows other illustrative graphical user interfaces that can be presented in place of graphical user interface region 610. The graphical user interfaces in FIG. 7 show other context activity information or activities that can be presented in the graphical user interface region 610. For example, the graphical user interface region 610 includes as the context activity information 612 an indication that the selected user is swimming 710, sleeping 712 or at a particular location 720. Specifically, if the combination of factors associated with the selected user are associated in the contextual information for location 209 storage with an indication that the selected user is swimming, the graphical user interface region 610 includes as the context activity information 612 an indication that the selected user is swimming 710. If the combination of factors associated with the selected user are associated in the contextual information for location 209 storage with an indication that the selected user is sleeping, the graphical user interface region 610 includes as the context activity information 612 an indication that the selected user is sleeping 712 and also indicates how long the user has been sleeping. In some implementations, the duration of time the user has been sleeping is inferred by the contextual information system 124 by measuring a difference between a current time and a last time the selected user has been active or has accessed the messaging client application 104. If the combination of factors associated with the selected user are not listed in the contextual information for location 209 storage, the contextual information system 124 determines that the selected user is not actively engaged in any activity and presents in the graphical user interface region 610 as the context activity information 612 the particular location 720 (e.g., current geographical location, such as city and state) of the device of selected user.

The graphical user interfaces in FIG. 8 show other context activity information or activities that can be presented in the graphical user interface region 610. For example, if a change in activity is determined for the selected user, a new status indicator 810 can be presented for a threshold period of time. The threshold period of time may be predetermined (e.g., 5 minutes) and/or may be set based on how long it takes the contextual information system 124 to obtain context activity information for the selected user. After the threshold period of time has elapsed, the new status indicator 810 is replaced with an indication of the currently determined context activity information for the selected user.

Figure 9:
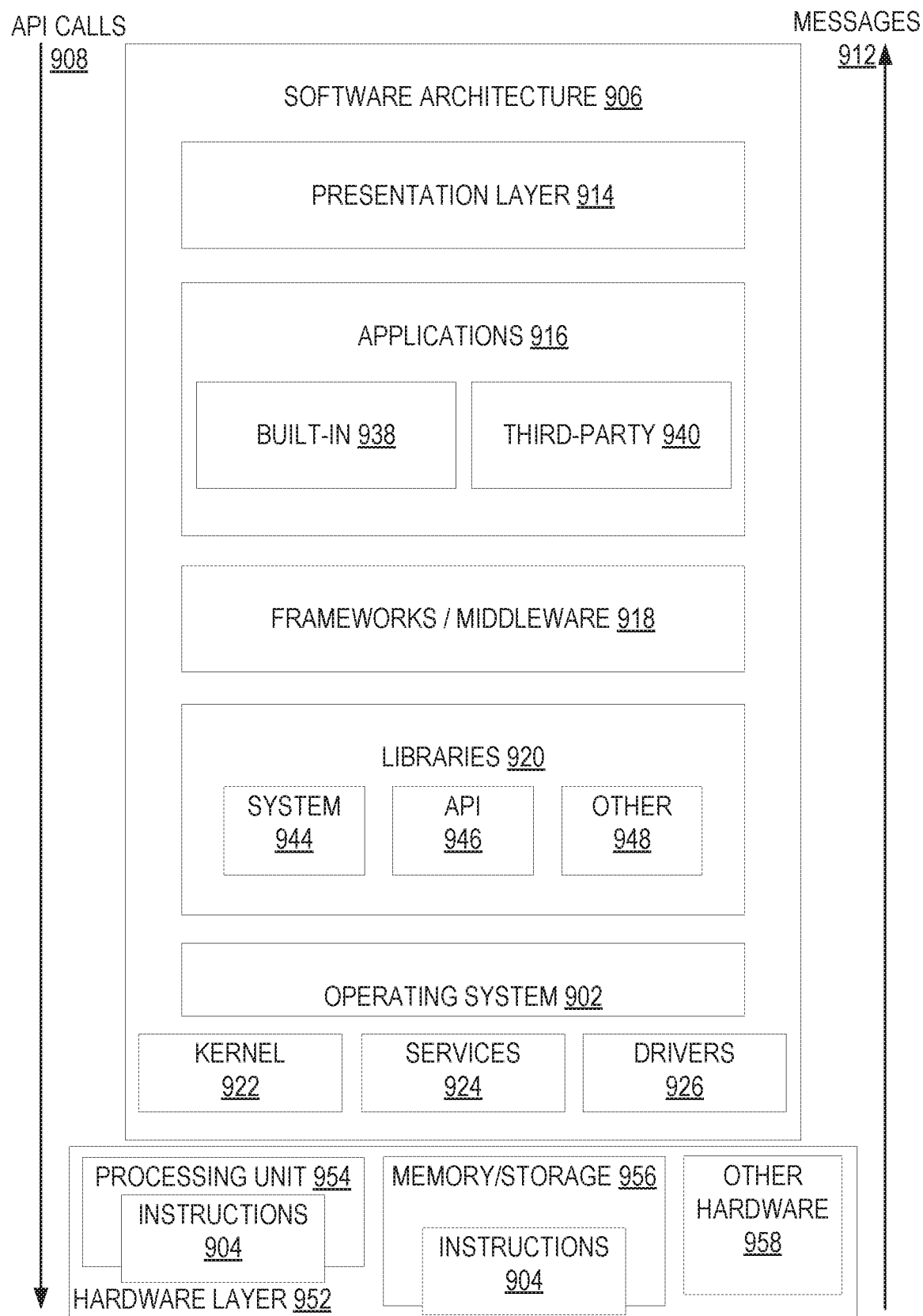
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic UI (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
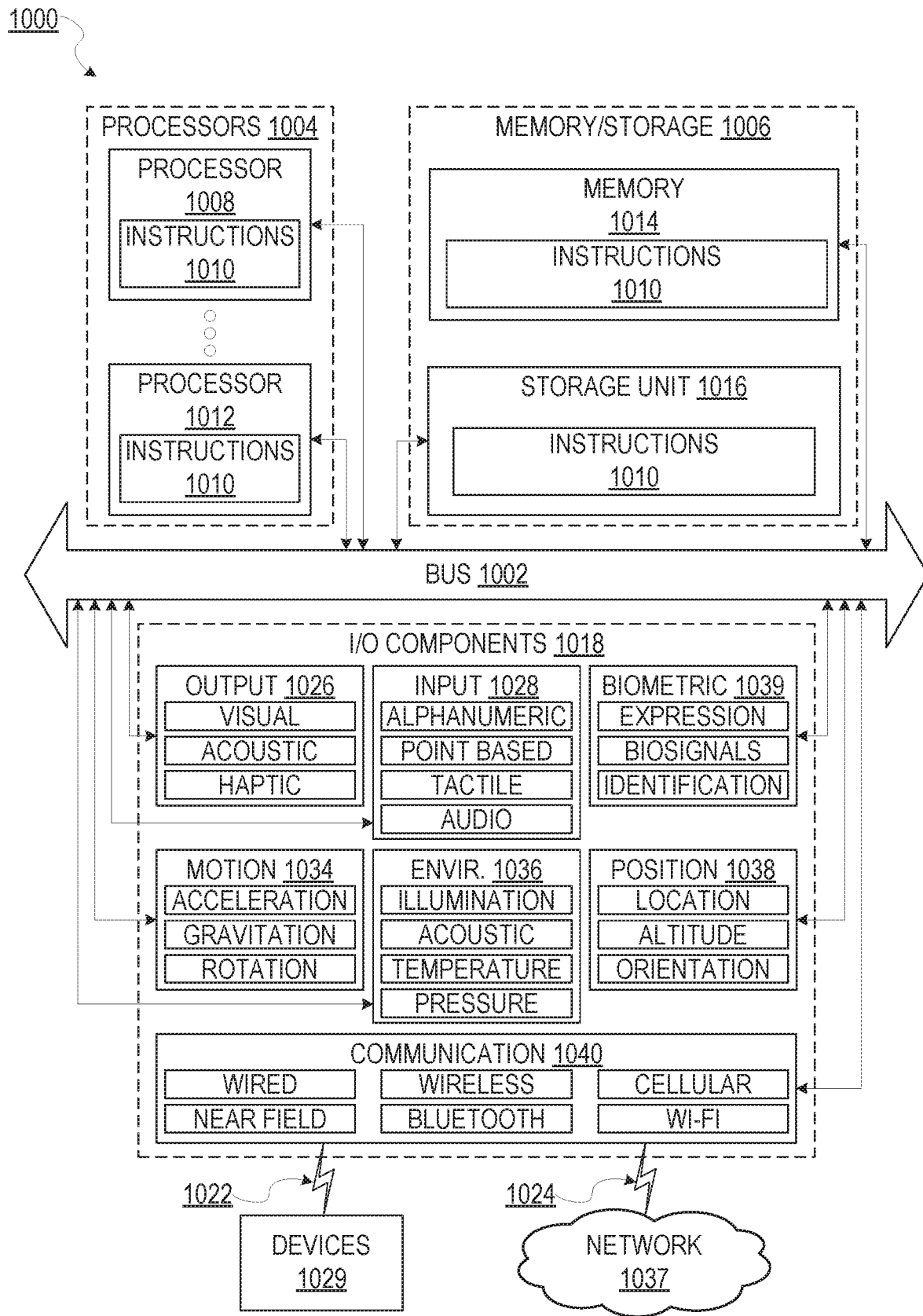
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein. "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands." "op codes." "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   receiving, by one or more processors, a request from a first user device to communicate with a second user device, the first user device being associated with a first user and the second user device being associated with a second user;
   determining, by the one or more processors, whether location information of the second user device is available to the first user device;
   in response to determining that the location information of the second user device is available to the first user device, determining, by the one or more processors, contextual activity information for the second user based on a current location of the second user device;
   generating, by the one or more processors, for display on the first user device, a visual representation of the second user and the contextual activity information in a graphical user interface that enables the first user device to communicate with the second user device;
   determining that the first user and the second user are in a same state or country; and
   excluding a representation of the same state or country from the graphical user interface in response to determining that the first user and the second user are in the same state or country.

2. The method of claim 1 further comprising storing a message indicating that the second user is travelling in association with a factor that indicates that the second user device is within a threshold distance of an airport.

3. The method of claim 1, wherein receiving the request from the first user device to communicate with the second user device comprises receiving, by the first user device, user input from the first user that identifies the second user from a plurality of users, further comprising storing a message indicating that the second user is playing a sport in association with a factor that indicates that the second user device is within a threshold distance of a venue associated with the sport.

4. The method of claim 1 further comprising storing a message indicating that the second user is inactive or sleeping in association with a factor that indicates that a last time the second user device has accessed a messaging application exceeds a threshold amount.

5. The method of claim 1, wherein determining whether location information of the second user device is available to the first user device comprises receiving, by the second user device, user input from the second user that selects an option to share a location of the second user device with one or more users including the first user, further comprising:
storing a first message indicating that the second user is on a watercraft in association with a first combination of factors that indicate that the second user device is in motion and the current location of the second user device overlaps an area of a map that includes a body of water; and
storing a second message indicating that the second user is at work in association with a second combination of factors that indicate that a battery charging status of the second user device is in a charging state, the current location of the second user device is within a threshold of a work address associated with the second user, and a current time of day corresponds to working hours.

6. The method of claim 1, further comprising:
determining whether the first user is in a group of users with whom the second user is sharing the location of the second user device;
determining that the second user is not actively engaged in any activity; and
in response to determining that the second user is not actively engaged in any activity, presenting the current location as the contextual activity information.

7. The method of claim 1 further comprising:
detecting a change in the contextual activity information for the second user;
in response to detecting the change in the contextual activity information for the second user, displaying in the graphical user interface a new status indicator for a threshold period of time corresponding to a length of time to obtain new contextual activity information for the second user; and
after the threshold period of time, replacing the new status indicator with the new contextual activity information for the second user.

8. The method of claim 1 further comprising:
identifying a state of a plurality of states that is within a threshold geographical distance of the current location of the second user device;
determining a current location of the first user device; and
determining whether the current location of the first user device is within the threshold geographical distance of the identified state.

9. The method of claim 8 further comprising generating for display in the graphical user interface on the first user device a visual representation of the identified state in response to determining that the current location of the first user device is outside of the threshold geographical distance of the identified state.

10. The method of claim 1 further comprising storing a message indicating that the second user is playing a sport in association with a combination of factors that indicate that the second user device is within a threshold distance of a venue associated with the snort and the second user has selected an avatar that includes a feature associated with the sport.

11. The method of claim 1 further comprising:
identifying a country that is within a threshold geographical distance of the current location of the second user device;
determining a current location of the first user device; and
determining whether the current location of the first user device is within the threshold geographical distance of the identified country.

12. The method of claim 11 further comprising generating for display in the graphical user interface on the first user device a visual representation of the identified country in response to determining that the current location of the first user device is outside of the threshold geographical distance of the identified country.

13. The method of claim 1, wherein the visual representation includes an avatar of the second user and a name of the second user, and wherein the contextual activity information includes text indicating a contextual activity, wherein the text is displayed adjacent to the name of the second user.

14. The method of claim 1, wherein determining the contextual activity information comprises:
accessing a map associated with the current location of the second user device;
identifying a place on the map that is within a threshold distance of the second user device;
determining a type of the identified place; and
selecting the contextual activity information from a plurality of contextual activities based on the type of the identified place.

15. The method of claim 1, wherein determining the contextual activity information comprises:
accessing motion information of the second user device;
determining a speed of the second user device based on the accessed motion information;
determining a type of a transportation vehicle being used by the second user based on the determined speed and area on a map associated with the current location of the second user device; and
selecting the contextual activity information from a plurality of contextual activities based on the type of the transportation vehicle being used by the second user.

16. The method of claim 1, wherein determining the contextual activity information comprises:
determining a battery charging state of the second user device; and
selecting the contextual activity information from a plurality of contextual activities based on a type of the battery charging state of the second user device.

17. The method of claim 1 further comprising:
determining whether the contextual activity information indicates the second user is actively engaged in an activity;
in response to determining that the contextual activity information indicates the second user is actively engaged in the activity, visually representing the activity in the graphical user interface of the first user device as part of the contextual activity information; and
in response to determining that the contextual activity information indicates the second user is not actively engaged in the activity, indicating the current location of the second user in the graphical user interface of the first user device as part of the contextual activity information.

18. A system comprising:
a processor configured to perform operations comprising:
receiving a request from a first user device to communicate with a second user device, the first user device being associated with a first user and the second user device being associated with a second user;

determining whether location information of the second user device is available to the first user device;

in response to determining that the location information of the second user device is available to the first user device, determining contextual activity information for the second user based on a current location of the second user device;

generating, for display on the first user device, a visual representation of the second user and the contextual activity information in a graphical user interface that enables the first user device to communicate with the second user device;

determining that the first user and the second user are in a same state or country; and excluding a representation of the same state or country from the graphical user interface in response to determining that the first user and the second user are in the same state or country.

19. The system of claim 18, wherein the operations further comprise:

determining whether the contextual activity information indicates the second user is actively engaged in an activity;

in response to determining that the contextual activity information indicates the second user is actively engaged in the activity, visually representing the activity in the graphical user interface of the first user device as part of the contextual activity information; and in response to determining that the contextual activity information indicates the second user is not actively engaged in the activity, indicating the current location of the second user in the graphical user interface of the first user device as part of the contextual activity information.

20. A non-transitory machine-readable storage medium that includes instructions that, when executed by one or more processors of a machine, cause the machine to perform operations comprising:

receiving a request from a first user device to communicate with a second user device, the first user device being associated with a first user and the second user device being associated with a second user;

determining whether location information of the second user device is available to the first user device;

in response to determining that the location information of the second user device is available to the first user device, determining contextual activity information for the second user based on a current location of the second user device; and generating, for display on the first user device, a visual representation of the second user and the contextual activity information in a graphical user interface that enables the first user device to communicate with the second user device;

determining that the first user and the second user are in a same state or country; and excluding a representation of the same state or country from the graphical user interface in response to determining that the first user and the second user are in the same state or country.

\* \* \* \* \*

UNITED STATES PATENT AND TRADEMARK OFFICE
CERTIFICATE OF CORRECTION

PATENT NO. : 10,852,918 B1
APPLICATION NO. : 16/297152
DATED : December 1, 2020
INVENTOR(S) : Jeremy Voss It is certified that error appears in the above-identified patent and that said Letters Patent is hereby corrected as shown below:

In the Claims

In Column 23, Line 61, in Claim 10, delete "snort" and insert --sport-- therefor Signed and Sealed this
Seventh Day of December, 2021

Drew Hirshfeld
*Performing the Functions and Duties of the
Under Secretary of Commerce for Intellectual Property and
Director of the United States Patent and Trademark Office*